US007020268B2

(12) United States Patent
Pelletier et al.

(10) Patent No.: US 7,020,268 B2
(45) Date of Patent: Mar. 28, 2006

(54) SYSTEM AND METHOD FOR PROVIDING TELEPHONY SERVICES TO REMOTE SUBSCRIBERS

(75) Inventors: Karen Jeanne Pelletier, Crystal Lake, IL (US); Rex Norman Bull, St. Charles, IL (US); Bruce A. Chatterley, Glen Ellyn, IL (US); David Anthony Orwick, Crystal Lake, IL (US); Wayne Robert Heinmiller, Elgin, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 10/901,517

(22) Filed: Jul. 29, 2004

(65) Prior Publication Data

US 2005/0002513 A1    Jan. 6, 2005

Related U.S. Application Data

(63) Continuation of application No. 10/141,271, filed on May 7, 2002, now Pat. No. 6,807,272, which is a continuation of application No. 09/251,031, filed on Feb. 18, 1999, now Pat. No. 6,411,704.

(51) Int. Cl.
*H04M 7/00*    (2006.01)

(52) U.S. Cl. .................. 379/230; 379/900; 370/352

(58) Field of Classification Search ............ 379/201.01
See application file for complete search history.

(56) References Cited

U.S. PATENT DOCUMENTS

| | | | |
|---|---|---|---|
| 4,266,098 A | 5/1981 | Novak ........................ 179/5.5 |
| 5,511,111 A | 4/1996 | Serbetcioglu et al. ......... 379/67 |
| 5,533,106 A | 7/1996 | Blumhart .................... 379/142 |
| 5,559,860 A | 9/1996 | Mizikovsky ................. 379/58 |
| 5,652,789 A | 7/1997 | Miner et al. ................ 379/201 |
| 5,703,940 A | 12/1997 | Sattar ........................ 379/201 |
| 5,724,412 A | 3/1998 | Srinivasan et al. |
| 5,742,905 A | 4/1998 | Pepe et al. .................. 455/461 |
| 5,796,806 A | 8/1998 | Birckbichler ................ 379/67 |
| 5,805,587 A | 9/1998 | Norris et al. ............... 370/352 |
| 5,818,836 A | 10/1998 | DuVal ....................... 370/389 |
| 5,825,862 A | 10/1998 | Voit et al. .................... 379/142 |
| 5,867,495 A | 2/1999 | Elliott et al. ................. 371/352 |
| 5,999,525 A | 12/1999 | Krishnaswamy et al. ... 370/352 |
| 6,137,869 A | 10/2000 | Voit et al. .................... 379/114 |
| 6,157,648 A | 12/2000 | Voit et al. ............. 379/88.17 X |
| 6,222,826 B1 | 4/2001 | Faynberg et al. ....... 379/229 X |
| 6,243,443 B1 | 6/2001 | Low et al. ............... 379/88.17 |
| 6,246,758 B1 | 6/2001 | Low et al. .................. 379/230 |
| 6,292,481 B1 | 9/2001 | Voit et al. .................... 370/352 |
| 6,295,292 B1 | 9/2001 | Voit et al. .................... 370/352 |

(Continued)

OTHER PUBLICATIONS www.lucent.com/enterprise/cci/downloads/barney/callinto.html.

(Continued)

Primary Examiner—Creighton Smith
(74) Attorney, Agent, or Firm—Baker Botts L.L.P.

(57) ABSTRACT

A system and method for providing telephony services, such as caller ID, voice mail, selective call forwarding, and the like, to a remote subscriber, typically located outside the providers regional territory. The system can include customer premise equipment (CPE) selectively connectable to a remote central office (CO), a packet-switched network gateway, such as an Internet telephony gateway (ITG), for remotely communicating service requests to a local service node. The local service node can be located within the service provider's territory and returns telephony service responses via the packet-switched network gateway to the remote CO, and ultimately the remote CPE.

20 Claims, 8 Drawing Sheets

U.S. PATENT DOCUMENTS 6,335,927 B1    1/2002    Elliott et al.    ............... 370/352
6,496,575 B1 *  12/2002   Vasell et al.    ........... 379/102.05

OTHER PUBLICATIONS www.lucent.com/enterprise/cci/downloads/barney/callapps.html.

www.lucent.com/supercomm98/info/com033098.html, Mar. 30, 1998.

www.lucent.com/enterprise/cci/downloads/barney/calltech4.html.

www.lucent.com/enterprise/cci/downloads/barney/calltech.html.

www.lucent.com/enterprise/cci/downloads/barney/callpurpose.html.

www.lucent.com/enterprise/cci/downloads/barney/callevolu.html.

www.lucent.com/enterprise/cci/downloads/barney/calltech3.html.

www.lucent.com/enterprise/cci/downloads/barney/calltech2.html.

* cited by examiner

SYSTEM AND METHOD FOR PROVIDING TELEPHONY SERVICES TO REMOTE SUBSCRIBERS

RELATED APPLICATIONS

This application is a continuation of prior application Ser. No. 10/141,271 filed May 7, 2002, now U.S. Pat. No. 6,807,272; which is a continuation of prior application Ser. No. 09/251,031 filed Feb. 18, 1999, now U.S. Pat. No. 6,411,704, which is hereby incorporated herein by reference in its entirety.

TECHNICAL FIELD OF THE INVENTION

The present invention relates generally to telecommunication services and, more particularly, to a system and method for remote provision of telephony services, such as Advanced Intelligent Network (AIN) services.

BACKGROUND OF THE INVENTION

There is an ever increasing trend by telecommunications service providers, such as a Regional Bell Operating Company (RBOC), to provide advanced telephony services at remote locations, such as locations outside their usual service territories. These advanced services generally can include any service above providing a dial tone, and CLAS features and information services providing sport scores, time or day or weather; voice-mail; busy don't answer; paging services; voice recordation and playback to third parties; speech or voice recognition; or recognition of dual tone multi-frequency (DTMF) signals, or the like. In order to provide advanced telephony services, an advanced service platform is required. To provide advanced services to geographically remote customers, the advanced service platform must be located either locally, e.g., at the central office of the service provider; or remotely, e.g., in a competing RBOC's territory where the service is to be provided.

Figure 1:
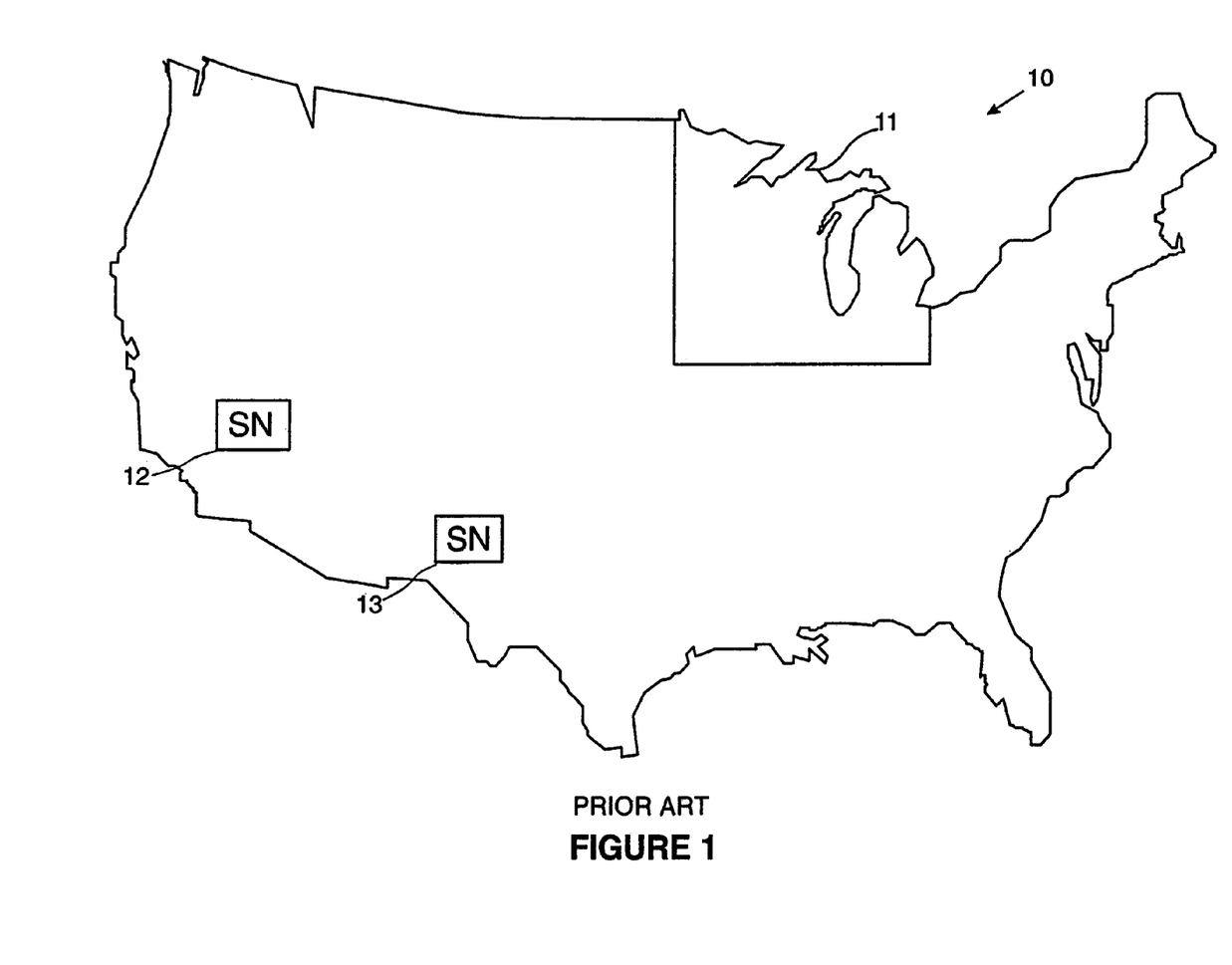
FIG. 1 illustrates a map showing exemplary geographically distributed advanced services platforms.

If the advanced service platform is to be located remotely, the service provider must incur a considerable expense. FIG. 1 shows a map 10 illustrating exemplary geographically distributed advance service platforms. In the example shown, a service provider maintains a local service territory 11, for example, generally located in the Midwest. To provide remote services in other areas, such as California or Texas, remote service nodes (SNs) 12, 13 must be located outside the service provider's territory 11. These service nodes can include any type of server capable of implementing the advanced service processors. In addition to providing remote platforms, anytime changes or repairs are required at the remote service nodes, service representatives from the service provider would have to be dispatched, which would add to the cost of providing the advanced service at the remote location.

Figure 2:
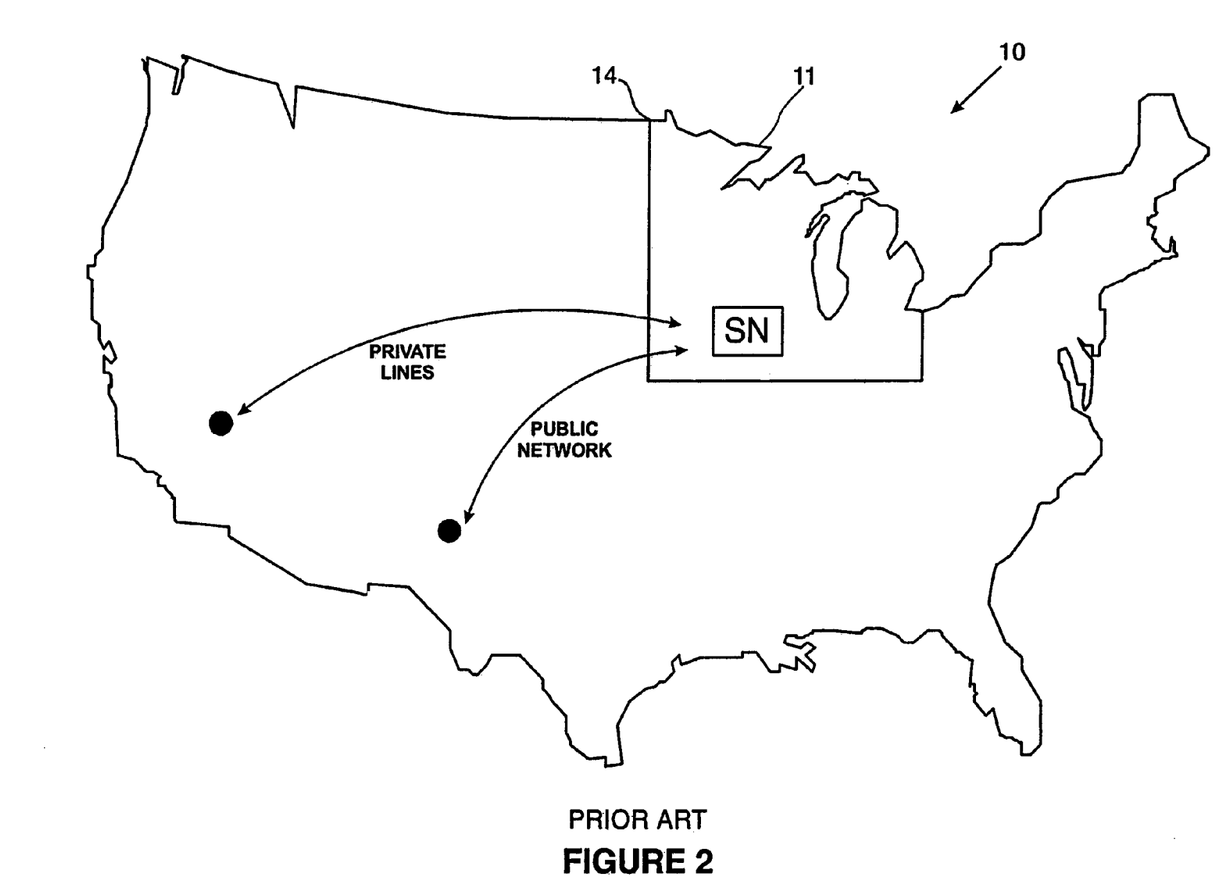
FIG. 2 illustrates a prior art technique of providing advanced services to remote subscribers.

Alternatively, advanced services can be provided to remote locations by redirecting calls, for example, cross country to the locale of the telecommunication service provider. This arrangement is illustrated in FIG. 2, where calls are redirected to the local telecommunication service provider local advanced service platform 14. Calls within its territory 11 are redirected from various the remote locations where the service is provided. This situation requires leased private lines, virtual private networks or re-routing and/or call forwarding over existing long distance or toll lines. These options are relatively expensive, and thus, would add to the cost of providing advanced services at a remote location by way of an advanced service platform located within the provider's territory. Thus, a need has arisen to provide advanced services at remote locations without requiring remotely located advanced service platforms and less expensive than known systems or call re-routing.

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION OF THE INVENTION

The present invention relates to a system and method for providing advanced telecommunication services to remote subscribers by way of a data network, such as the Internet.

As used herein, "local" generally refers to the service territory of the service provider and "remote" generally refers to a territory outside of the service provider's territory. Turning now to the figures, and in particular to FIG. 3, there is illustrated a map 10, which conceptually illustrates the system and method for providing advanced telecommunications services in remote locations in accordance with an embodiment of the present invention. To provide advanced services to remote subscribers located outside a provider's regional territory 11, one or more packet-switched network gateways, 16, 17, such as Internet telephony gateways (ITGs), are provided in service areas, located outside the provider's normal territory 11. The ITGs 16 and 17 can be coupled to geographically remote central offices (not shown) and to the public Internet 18. A local ITG 15 may be used to provide a gateway between the Internet 18 and a local advance services node 19 located within the service provider's territory. This arrangement permits remote subscribers to access the service platform 19 via the Internet 18. Utilizing a public packet-switched network, such as the Internet, to provide advanced services in accordance with the present invention, significantly reduces the cost of providing these services to remote subscribers, as well as obviates the need for the service provider to provide and maintain service nodes outside its local territory.

Figure 3:
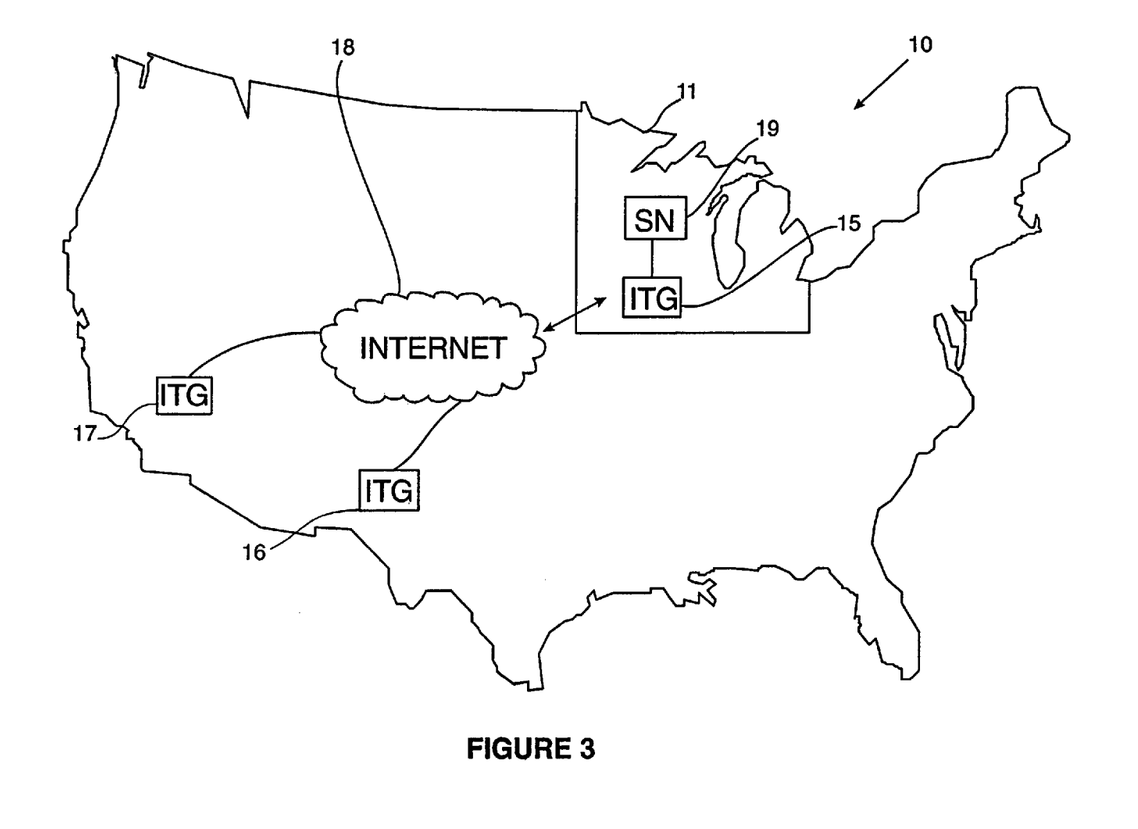
FIG. 3 is a map illustrating a method and system for providing advanced telephone services to remote subscribers in accordance with an embodiment of the present invention.

An alternative to using the Internet is the use of a private internet protocol (IP) backbone network. A private IP backbone connecting the ITGs 17–18 can provide higher data throughput and reduced latency.

Although FIG. 3 shows the service node 19 located within the provider's regional territory 11, the scope of the present invention is not so limited. It is within the privy of the present invention to locate the service node 19 anywhere, whether inside or outside the regional territory 11.

Figure 4:
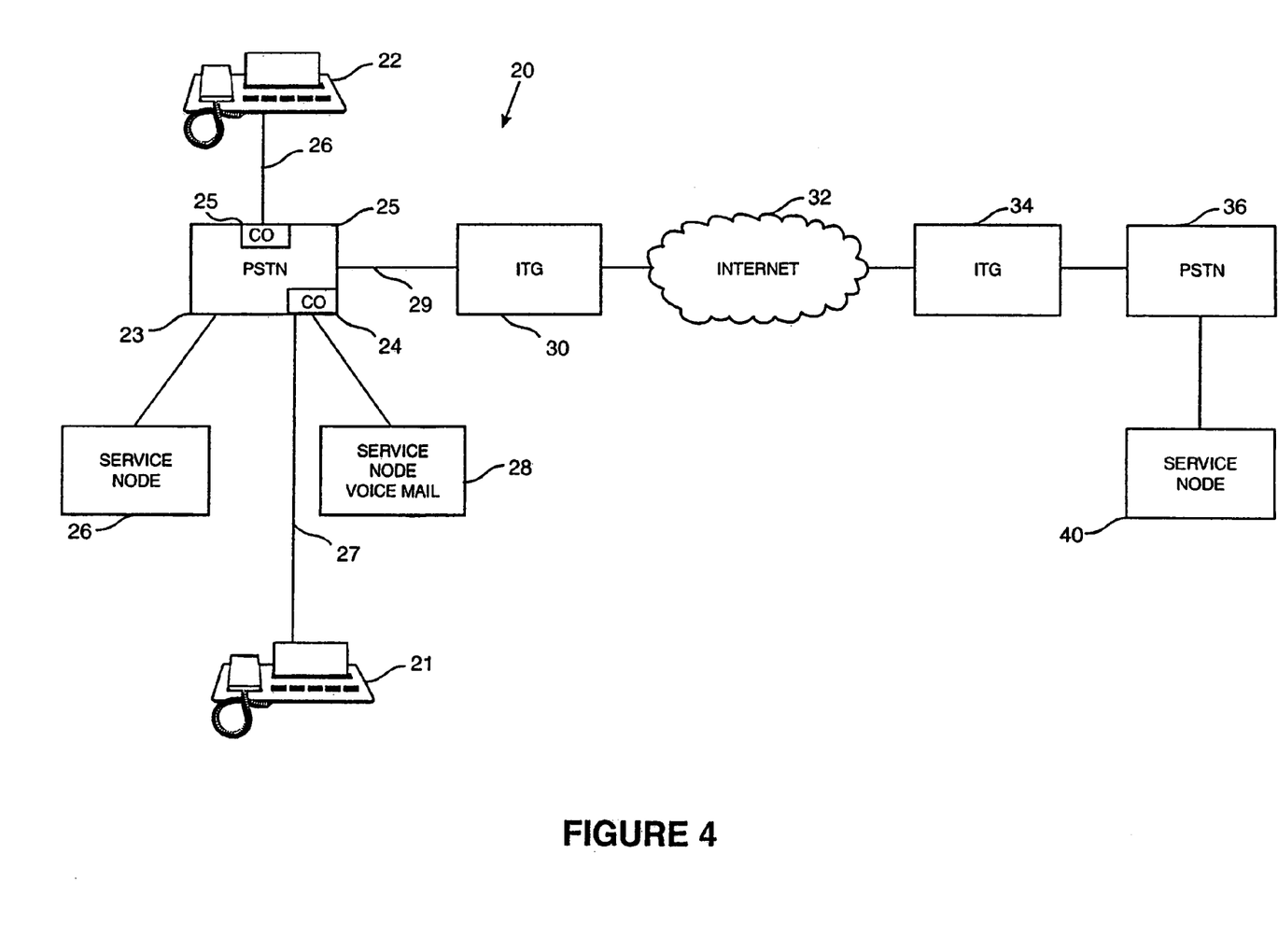
FIG. 4 is a block diagram of a telecommunication system in accordance with an embodiment of the present invention.

Referring now to FIG. 4, an exemplary telecommunication system 10, illustrating an embodiment of the present invention, is shown which includes multiple customer premises equipments (CPEs) 21, 22, such as telephone sets or handsets, cellular phones and the like, which can be connected through central offices 24, 25, or the like, to the public switched telephone network (PSTN) 23. In addition, a remote ITG 34 is adapted to receive requests from CPEs and forward the requests via the Internet 32 to a local ITG 30, coupled to an advanced services processor (ASP) included in a service node (SN) 26, 28. The SN 26, 28 supplies the requested telephony service, such as caller ID, call screening, caller identification, voice-mail, selective call forwarding, and the like by sending digitized signals through the local ITG 30, over the Internet 32 or another packet-switched network, to the remote ITG 34. The CO can then present the service to the CPE.

The telecommunication system 10 includes a subscriber CPE 21 at the remote site and called party CPE 22. Both of the CPEs 21, 22 are connected to the PSTN 23. The PSTN 23 includes a caller CO 24 connectable to the CPE 21 using a standard communication path 27, such as an analog local-loop, an integrated services digital network ISDN) interface, or the like. In similar fashion, the PSTN 23 is connectable via a called party CO 25 over a line 26 to the CPE 22. The CPEs 21, 22 can be connected to the same CO.

The PSTN 23 may include telephony services associated with it, such as voice-mail provided at one or more service nodes 26, 28. Such service nodes may be implemented using a communication server or a service node/intelligent peripheral (SN/IP), such as the Compact Service Node (CSN), available from lucent Technologies, Inc.

A remote ITG 30 is connected over a dial-up connection 29 to the CDs 24, 25 of the PSTN 23. The ITG 30 is used to transfer messages over the Internet 32, which can be received by a local ITG 34. Both ITGs 30, 34 can be implemented using commercially available ITGs, such as those available from Internet telephony gateway suppliers, such as 3COM/USR, Ascend, or Cisco Systems.

The ITG 34 is coupled via PSTN 36 to a local service node (SN) 40, which can be an ASP used to provide voice-mail, caller identification, caller identification, privacy management, call forwarding, or similar advanced telephony services. The SN 40 can be implemented using a SN/IP, such as a CSN from lucent Technologies, Inc.

Figure 5:
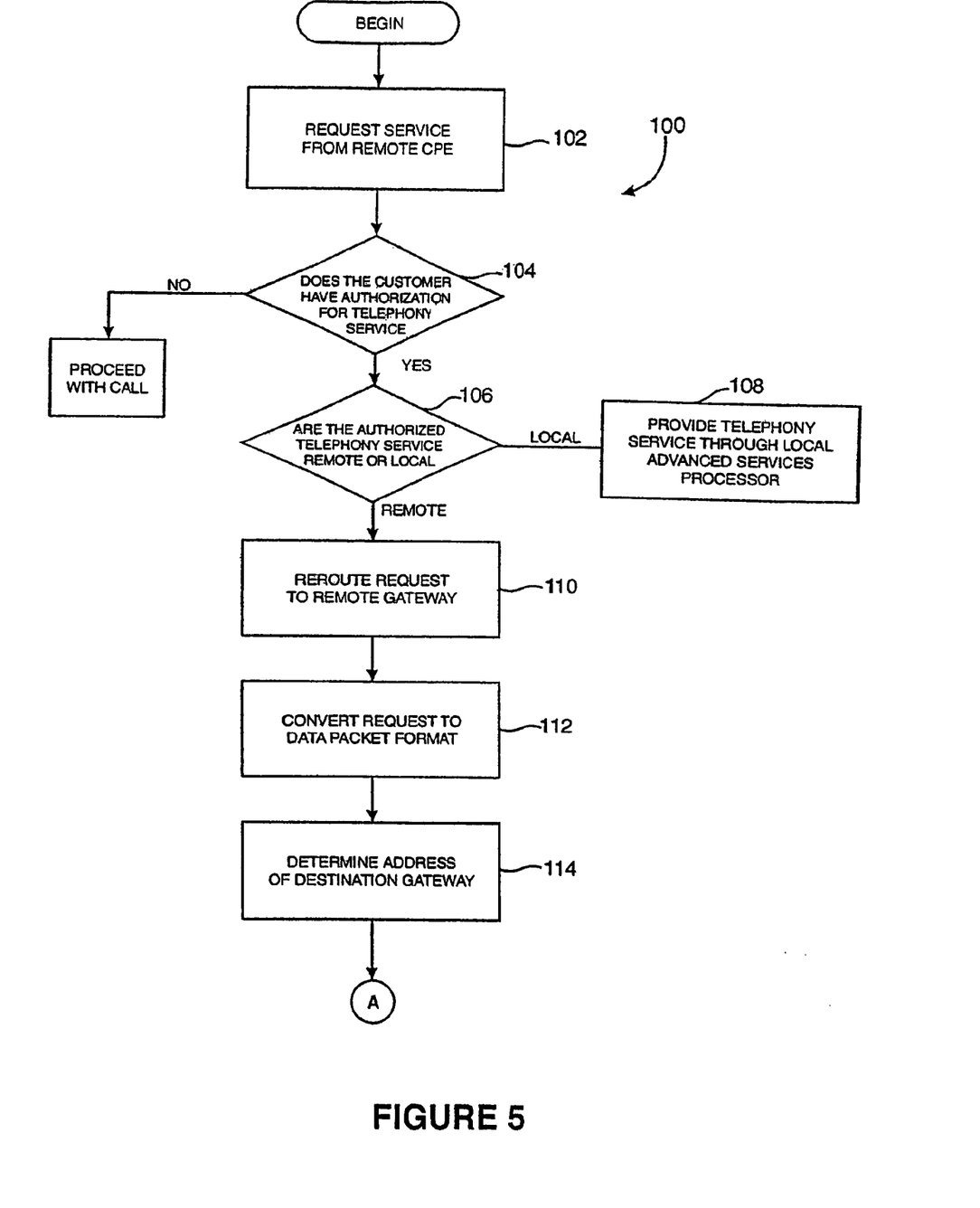
FIGS. 5 and 6 show a flow diagram of a method of operating the telecommunication system shown in FIG. 4, in accordance with an embodiment of the present invention.

FIG. 5 shows a flowchart illustrating a method 100 of operating the system 20 in accordance with an embodiment of the invention. In the operation of the telecommunication system 10, a caller A requests an advanced service by accessing the CPE 21 (step 102), which may be a conventional telephone, by lifting the cradle and establishing communication with the PSTN 23 at the CO 24. The PSTN 23 can also connect the call to the CPE 22 at the called party B. In such a situation, one or both of the parties may have a localized, advanced service, such as voice mail services at node 28 or other service nodes. The system tests for authorization to access advanced services in step 104.

If however, the caller A is a subscriber to one or more of the telephone services, the service logic in the PSTN 23 examines whether the telephony services are to be provided locally or remotely in a step 106. If the services are to be provided locally, for instance by the SNs 26, 28, the authorized services are provided in step 108. If the party A is to be provided with a remote service, the PSTN 23 service reroutes the call to a telephone number associated with the ITG 30 in a step 110. The ITG 30 converts the incoming service request to a data packet format, such as a TCP/IP format (step 112). A determination is then made from the service request as to the address of the destination ITG 34 (step 114). The data packets are then forwarded by one or more routers or switches on the Internet to the local ITG 34 (step 116).

Figure 6:
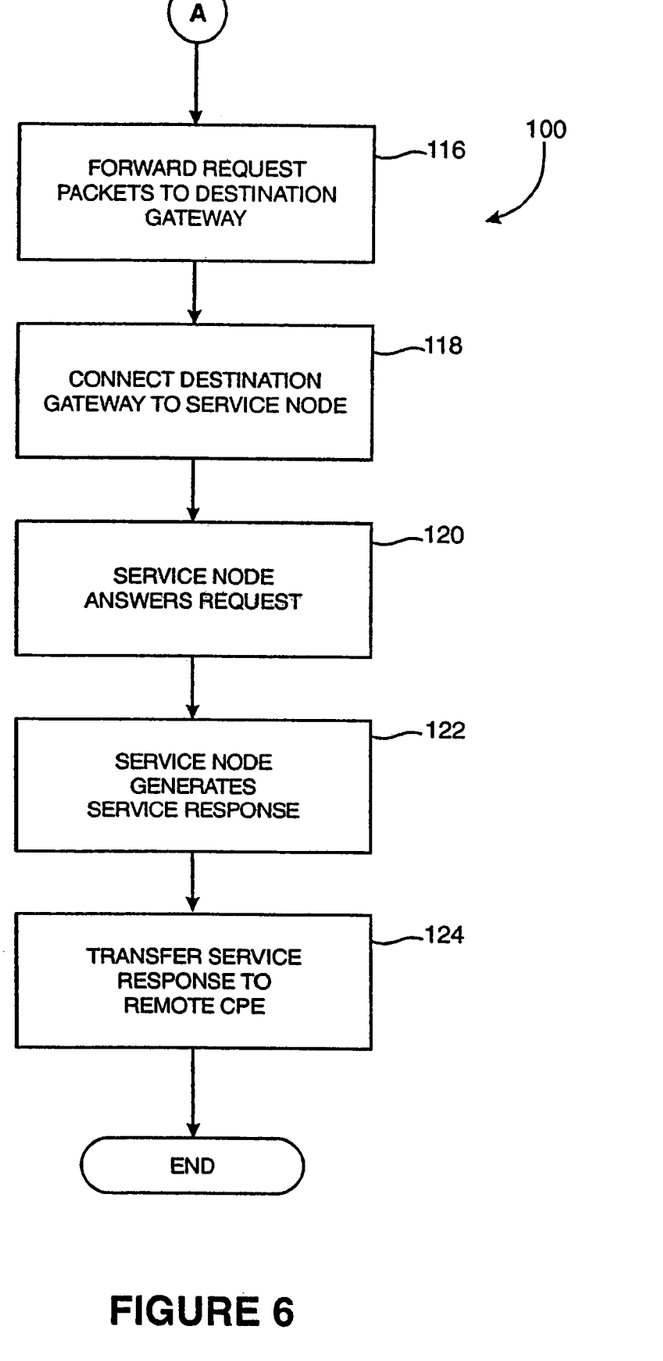

The local ITG 34 connects to the SN 40 through a second PSTN 36 in step 118. The request through the PSTN 36 is directed to the SN 40 for processing. The SN 40 then answers the request in step 120. The SN 40 associates the PSTN 36 on which it receives the call together with a parameter in the service request received from the ITG 34 with a service to be performed. The service might be call forwarding, call waiting, caller ID, voice-mail, call screening, or the like. At this point, audio information may be exchanged between the SN 40 and caller A using CPE 21 in a step 124. Audio information can be passed in both directions. Service logic in the SN 40 interacts with the caller A and determines the services or treatment to be applied to the call and generates a service response (step 122). The call can then receive the service response from SN 40 (step 124), or the call could be routed to additional destination SNs. The SN 40 might, for instance, route the call back through the Internet to the first PSTN 23.

The call can then ring at the CPE 22 of party B. There may be additional interactions with the SN 40 before the caller A and the party B converse. Alternatively, the call may be routed to voice-mail, a cellular phone, or the like, based on the final telephone network designated by the SN 40 based on advanced services process being performed.

Figure 7:
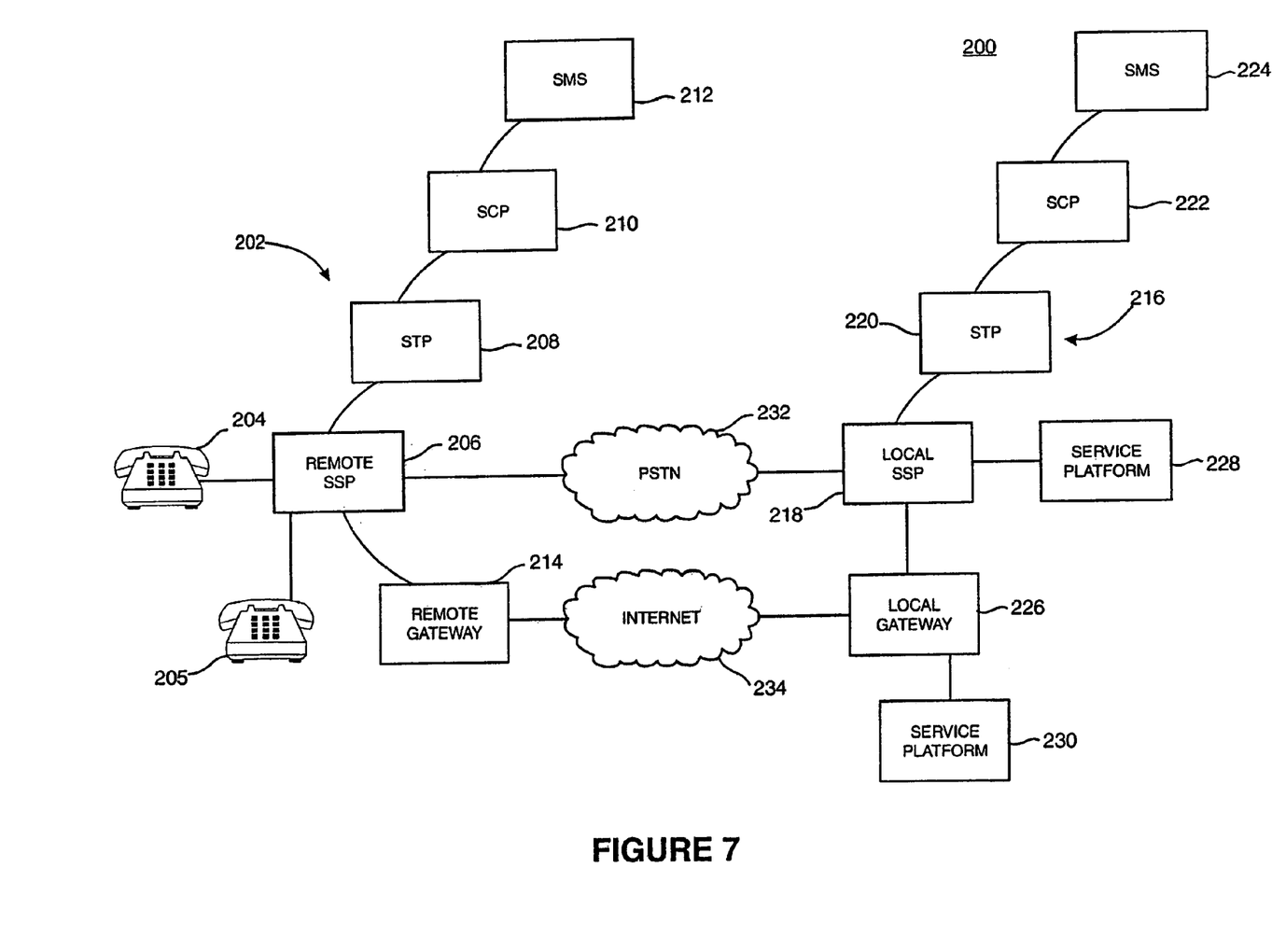
FIG. 7 is a block diagram of a telecommunication system in accordance with an embodiment of the present invention.

FIG. 7 illustrates a block diagram of a telecommunication system 200 in accordance with another embodiment of the present invention. The system 200 includes a remote advanced intelligent network (AIN) 202 and a local AIN 216. Typically, the remote AIN 202 is located outside the service provider's normal operating territory, while the local AIN 216 resides within the service provider's territory. The remote and local AINs 202, 216 communicate with one another over the PSTN 232.

The remote AIN 202 includes a service management system (SMS) 212, a switching control point (SCP) 210, a switch transfer point (STP) 208, a remote switching service point (SSP) 206, a subscriber CPE 204, and a called party CPE 205. Similarly, the local AIN 216 can include an SMS 224, an SCP 222, an STP 220, and a local SSP 218. In each AIN, the telephone network uses common channel signaling (CCS) for communication between the SMS, SCP, STP, STP, SSP and SSP. CCS is an out-of-band signaling method that utilizes packet-switched networking to allow messages to be transported on a dedicated highspeed data network, separate from the subscriber voice or data communication path. The CCS utilizes the Signaling System No. 7 (SS7) protocol to send messages between the network elements regarding call setup, line status, caller identification, and other network data, including AIN inquiries. The use of SS7 in an AIN is well known to those skilled in the art. AIN elements, suitable for implementing an embodiment of the present invention are commercially available from several vendors and are known to those skilled in the art. For example, the functionality of the SSPs 206, 218, as disclosed herein can be implemented using any AIN compatible switch, such as a 5ESS switch, available from Lucent Technologies, Inc.

A remote gateway 214 provides a communication path between the remote SSP 206, and a packet-switched network, such as the Internet 234. The remote gateway 214 can be implemented using an ITG, such as that described above herein.

A local gateway 226 communicates with the remote gateway 214 via the packet-switched network 234. The local gateway 226 can be a commercially available ITG. One or more service platforms are provided within the local AIN 216. As shown, the service platform 228 can be operatively coupled to the local SSP 218. In addition, a service platform 230 can be directly coupled to the local gateway 226. The service platforms 228, 230 can provide advanced services to the remote CPE 204 upon requests received via the public packet-switched network 234.

The service platforms 228, 230 can be implemented using commercially available AIN service nodes, such as a service node/intelligent peripheral (SN/IP) available from Lucent Technologies, Inc., as a Compact Service Node. Although not shown, one of ordinary skill in the art would readily appreciate that functionality of the service platforms can be incorporated into either the remote gateway 214, or the local gateway 226, without having to provide separate service platform components.

In system 200, an advanced service residing on either service platform 228, 230 is provided to the subscriber CPE 204 as follows. Initially, the subscriber CPE 204 can place a call to the called party CPE 205. During the course of the call, the remote SSP 206 can encounter an AIN trigger, such as a service request made by the caller. The remote SSP 206 notifies the SCP 210 of the trigger event via the STP 208. Service logic within the SCP 210 can generate an SCP response message directing the SSP 206 to route the call to the remote gateway 214. Upon connecting the call to the remote gateway 214, the service request can be packetized by the gateway 214 according to a protocol suitable for transporting the service request over the public packet-switched network 234. In an embodiment of the present invention relying on the Internet, the remote gateway 214 encapsulates the service request into data packets for transmission using a TCP/IP protocol. The data packets are then transferred to the local gateway 226.

The data packets transferred over the packet-switched network can include SS7 signaling. The SS7 signals sent via the packet-switched network can be used within the local AIN 216, to perform the requested service via AIN elements.

Upon receiving the data packets containing the service request, the local gateway 226 determines which service platform can provide the services based on parameters included in the service request. If the service resides on the service platform 230, the local gateway 226 requests the service using a suitable communications interface between the service platform 230 and the gateway 226, such as a commercially available data transfer protocol such as TCP/IP, Ethernet, or the like. If the service resides on the service platform 228 attached to the local SSP 218, the local gateway 226 places a call to the service platform 228, which is routed through the local SSP 218. The local gateway 226 and the service platform 228 communicate using conventional circuit-switched telephony protocol.

After processing a service request, the service platform returns a response to the local gateway 226, which in turn transfers the response to the remote gateway via the public packet-switched network 234. The remote gateway 214 then transfers the response via the remote SSP 206 to the subscriber CPE 204.

Figure 8:
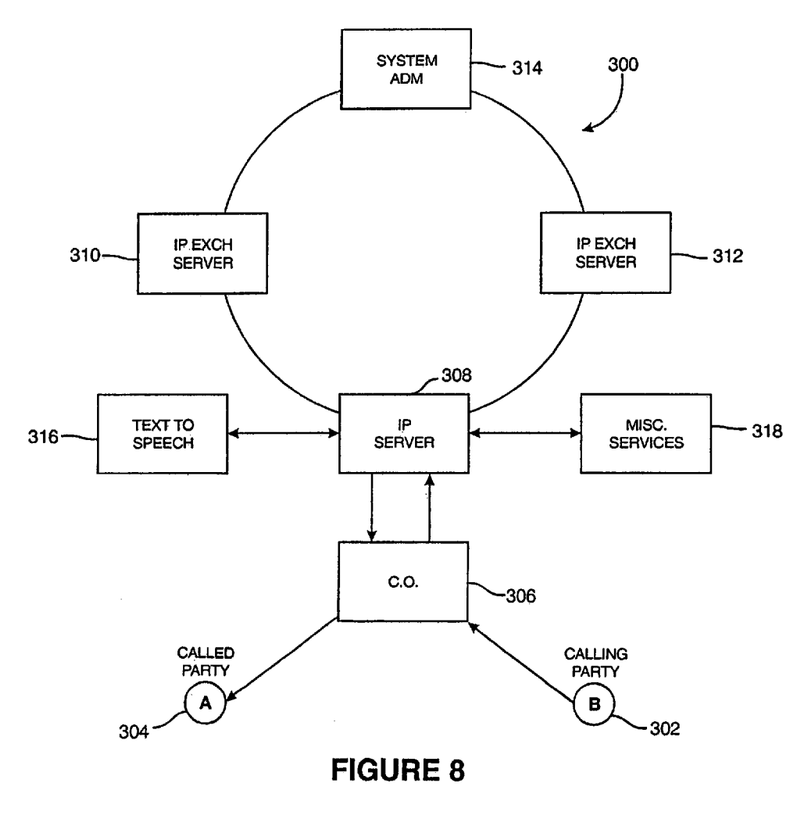
FIG. 8 is a block diagram of a telecommunication system in accordance with an embodiment of the present invention.

FIG. 8 illustrates a block diagram of telecommunication system 300 in accordance with a further embodiment of the present invention. The system 300 includes a central office (CO) 306, an Internet protocol (IP) server 308, a text-to-speech (TTS) service 316, miscellaneous services 318, such as voice mail, voice recognition, dialup information services, message forwarding, or the like. One or more IP exchange servers 310–312 permit the IP server 308 to communicate with a system administrator 314.

The system 300 can provide advance telephony services to a remote called party 304. This can be accomplished as follows. A calling party 302 can place a conventional phone call to called party 304. The call is received at the CO 306. The CO 306 includes a switch (not shown) which receives the call from the called party 302. The switch can be configured to provide remote call forwarding (RCF) to the called party 304. RCF essentially intercepts incoming calls to party A, then forwards them to the IP server 308. The IP server 308 can communicate with the CO switch using a toll free trunk having a predetermined number. Accordingly, to forward party A's incoming calls, the RCF service connects the incoming calls to the toll free trunk number prior to ringing party A.

The IP server 308 can include an ITG as described above herein. In response to the forwarded call, the IP server 308 initiates a predetermined service subscribed to by party A. The service can be any advanced telephony service, such as voice mail, call screening, or the like. The service can be implemented using one or more software programs executable by the IP server 308. Depending on the selected service, the IP server 308 can perform various actions based on the incoming forwarded call. For instance, the IP server 308 could record a voice message left by party B, or could likewise play back a prerecorded voice message to party B. The IP server 308 could also cause the switch to disconnect the incoming call from party B, or alternatively, cause the switch to connect the incoming call the called party 304.

The called party 304 can also subscribe to a distinctive ring service, which provides distinctive ring cadences for incoming calls processed by the IP server 308, and those coming directly from a calling party without first being processed by the IP server 308.

To further illustrate the operation of the system 300, an exemplary call screening service will now b~described. Essentially, the call screening service can screen all incoming calls to party A, to determine whether caller ID information is being provided by the calling party. If no caller ID information is present, the screening service automatically requests the information from the calling party before connecting the called party A. The request can be made using the TTS service 316 to present an audible message to the calling party. In response to the voiced request, the calling party can utter a spoken message identifying himself/herself. Alternatively, the calling party can key in a phone number or other identifying number using a touch-tone keypad. The caller identification information provided by the calling party can then be either forwarded to the called party or compared to a predetermined database of callers stored within the IP server 308. These actions can occur before connecting the calling party to the called party. Based on the caller identification information, the IP server 308 can direct the CO switch to either connect the call to the called party 304, or refuse the connection and terminate the call.

The CO switch can be implemented using a commercially available telecommunication switch, such as the 5ESS, from Lucent Technologies, Inc. Such a switch ports the distinctive ring and remote call forwarding features.

The IP exchange servers 310–312 can be IP nodes or routers permitting the IP server 308 to communication with the system administrator 314 using a packet-switched network, such as the Internet or a private IP backbone network. The system administrator 314 can be any type of computer capable of communicating with the IP server 308 via any of the IP exchange servers. The system administrator 314 can be programmed to provide service administration functions, such as processing of service orders from subscribers, authentication of service requests, and service billing.

With respect to service orders, the service administrator 314 can include a server configured to act as a Web site accessible via the public Internet. Subscribers and consumers interested in subscribing to services can access the Web site over the Internet to place orders for services available through the IP server 308. Upon receiving a service order, the system administrator 314 can configure the IP server 308 to provide the service to the subscriber. In ordering new services, a subscriber can be identified by his/her ten-digit phone number. For services requiring call transfer from the CO 306 to the IP server 308, the CO can be configured to identify subscribers according to their ten-digit phone number.

Regarding the authentication function of the system administrator 314, some services, such as voice mail, will require a subscriber to enter a personal identification (PIN) before access is permitted. In such a circumstance the subscriber party can key in a PIN number which is received by the IP server 308 and then forwarded via the packet-switched network to the system administrator 314. The system administrator 314 can include a database of subscribers and their corresponding PIN numbers for authenticating the service request.

With respect to the billing functionality, the system administrator 314 can generate billing reports for subscribers based on messages received from the IP server 308. For instance, services can be provided on a per-use fee basis. Accordingly, every time the service is utilized by a subscriber, the IP server 308 can record the usage and then forward this usage information to the system administrator 314, which in turn generates a subscriber billing report.

Obviously, many modifications and variations of the present invention are possible in light of the above teaching. Thus, it is to be understood that within the scope of the appended claims the invention may be practiced otherwise then is specifically above.

What is claimed is:

1. A method comprising:
receiving, at a telephony service provider, a request for a telephony service from a subscriber in a remote territory, wherein the remote territory is outside a local territory of the telephony service provider; and
routing the request from the remote territory to the local territory over a packet-switched network.

2. The method of claim 1, further comprising:
generating a service response in response to the request using a service node in the local territory; and
routing the service response from the local territory to the remote territory over the packet-switched network.

3. The method of claim 1, further comprising:
routing the request to a service node in the remote territory; and
generating a service response using the service node in the remote territory.

4. The method of claim 3, further comprising:
routing the request received at the local territory back to the remote territory over the packet-switched network.

5. The method of claim 1, wherein the routing includes routing the service response through an Internet telephony gateway (ITG).

6. The method of claim 1, wherein the telephony service is selected from the group consisting of a voice mail service, a caller identification service, a caller screening service, or a call forwarding service.

7. A computer readable medium embodying a program of executable instructions, said program of instructions comprising:
at least one instruction to receive, at a telephony service provider, a request for a telephony service from a subscriber in a remote territory, wherein the remote territory is outside a local territory of the telephony service provider; and
at least one instruction to route the request from the remote territory to the local territory over a packet-switched network.

8. The computer readable medium of claim 7, further comprising:
at least one instruction to generate a service response in response to the request using a service node in the local territory; and
at least one instruction to route the service response from the local territory to the remote territory over the packet-switched network.

9. The computer readable medium of claim 7, further comprising:
at least one instruction to route the request to a service node in the remote territory; and
at least one instruction to generate a service response using the service node in the remote territory.

10. The computer readable medium of claim 9, further comprising:
at least one instruction to route the request received at the local territory back to the remote territory over the packet-switched network.

11. The computer readable medium of claim 7, wherein the at least one instruction to route includes at least one instruction to route the service response through an Internet telephony gateway (ITG).

12. The computer readable medium of claim 7, wherein the telephony service is selected from the group consisting of a voice mail service, a caller identification service, a caller screening service, or a call forwarding service.

13. A system comprising:
a local gateway located in a local territory of a telephony service provider, the local gateway to receive a request for a telephony service from a subscriber in a remote territory, wherein the remote territory is outside a local territory of the telephony service provider; and
a remote gateway located in the remote territory, the remote gateway to route the request from the remote territory to the local territory over a packet-switched network.

14. The system of claim 13, further comprising:
a service platform in the local territory to receive the request and generate a service response in response to the request.

15. The system of claim 14, further comprising:
a local switching service point (SSP) coupled to the local service platform and the local gateway.

16. The system of claim 15, wherein the local SSP comprises an advanced intelligent network (AIN) switch.

17. The system of claim 13, further comprising:
a service platform in the remote territory to receive the request and generate a service response in response to the request.

18. The system of claim 16, further comprising:
a remote switching service point (SSP) coupled to the remote service platform and the remote gateway.

19. The system of claim 13, wherein the local gateway and the remote gateway are Internet telephony gateways (ITG).

20. The system of claim 13, wherein the telephony service is selected from the group consisting of a voice mail service, a caller identification service, a caller screening service, or a call forwarding service.

* * * * *